(12) United States Patent
Yamada

(10) Patent No.: US 6,631,236 B2
(45) Date of Patent: Oct. 7, 2003

(54) PHOTONIC CRYSTAL WAVEGUIDE AND DIRECTIONAL COUPLER USING THE SAME

(75) Inventor: Hirohito Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 222 days.

(21) Appl. No.: 09/819,797

(22) Filed: Mar. 29, 2001

(65) Prior Publication Data

US 2001/0026668 A1 Oct. 4, 2001

(51) Int. Cl.[7] .................................................. G02B 6/10
(52) U.S. Cl. ...................... 385/129; 385/130; 385/131; 385/132; 385/42; 385/14
(58) Field of Search .......................... 385/14, 129, 130, 385/131, 132, 123, 124, 125, 27, 40, 41, 42, 141

(56) References Cited

U.S. PATENT DOCUMENTS

| | | | | |
|---|---|---|---|---|
| 5,526,449 A | * | 6/1996 | Meade et al. .................. | 385/14 |
| 5,802,236 A | * | 9/1998 | DiGiovanni et al. ......... | 385/127 |
| 6,101,300 A | * | 8/2000 | Fan et al. ...................... | 385/27 |
| 6,175,671 B1 | * | 1/2001 | Roberts ......................... | 385/14 |
| 6,260,388 B1 | * | 7/2001 | Borrelli et al. ................ | 65/393 |
| 6,381,389 B1 | * | 4/2002 | Kosaka ........................... | 385/39 |
| 6,496,632 B2 | * | 12/2002 | Borrelli et al. .............. | 385/123 |
| 6,512,866 B1 | * | 1/2003 | Fan et al. ...................... | 385/27 |
| 6,542,654 B1 | * | 4/2003 | Miller et al. ................... | 385/16 |
| 6,542,682 B2 | * | 4/2003 | Cotteverte et al. ........... | 385/125 |
| 2003/0068152 A1 | * | 4/2003 | Gunn, III | |

* cited by examiner

Primary Examiner—Brian Healy
(74) Attorney, Agent, or Firm—Young & Thompson

(57) ABSTRACT

The present invention provides a photonic crystal waveguide comprising: a substrate; a bottom cladding layer over the substrate; and a core layer over the bottom cladding layer, the core layer having a uniform distribution of holes, wherein the core layer has at least a waveguide region which is thicker than a remaining region of the core layer to cause a refractive index guide effect, or wherein the core layer has at least a waveguide region, on which a dielectric pattern is provided which has a refractive index higher than a substance in contact with a top surface of the core layer, or wherein the core layer has at least a waveguide region, and the holes except on the waveguide region are filled with an air, whilst the holes on the waveguide regions are filled with a filler material having a refractive index higher than 1.

49 Claims, 18 Drawing Sheets dry etching process focused ion beam

US 6,631,236 B2

PHOTONIC CRYSTAL WAVEGUIDE AND DIRECTIONAL COUPLER USING THE SAME

BACKGROUND OF THE INVENTION

The present invention relates to a photonic crystal waveguide, and a directional coupler using the same and more particularly to a photonic crystal waveguide in a form of a photonic crystal micro optical circuit for optical communications.

It has been known in the art that the photonic crystal waveguide is used as an optical filter for selecting transmittable optical wavelength, an optical multiplexer/demultiplexer, and an optical dispersion-compensating device in the various fields of optical communication systems, optical switching systems and optical measuring systems. The directional coupler uses the photonic crystal waveguide.

In recent years, a photonic crystal has received a great deal of attention as a three-dimensional periodic structure having a refractive index in the same order as the optical wavelength. This photonic crystal has a potential capability of a remarkable size reduction of the optical circuit by three digits or more. For this reason, it has been on the great expectation to apply the photonic crystal to the micro-optical circuit. Various structures of the optical waveguide in the form of the micro-optical circuit formed in the photonic crystal have been proposed.

FIG. 1 is a fragmentary schematic perspective view illustrative of a first conventional optical waveguide in the photonic crystal. The optical waveguide comprises a line defect introduced in the photonic crystal which has a complete photonic band gap to a wavelength of the optical wave to be propagated through the optical waveguide. Namely, the line defect in the photonic crystal is used as the optical waveguide. This line defect optical waveguide has a high optical confinement function, for which reason the line defect optical waveguide is responsible to a abrupt or tight curve. Thus, the line defect optical waveguide provides a large freedom in pattern of the optical circuit and also allows a remarkable size reduction of the optical circuit.

The photonic crystal has a three dimensional periodical structure which comprises lamination structures of a bottom cladding layer 11 of a first material having a low refractive index, a core layer 12 of a second material having a high refractive index and a top cladding layer 13 of the first material, wherein the core layer 12 is sandwiched between the top and bottom cladding layers 11 and 13. The core layer 12 has a high refractive index, whilst the top and bottom cladding layers 11 and 13 have a low refractive index. The core layer 12 may be made of silicon. Each of the top and bottom cladding layers 11 and 13 may be made of silicon dioxide. The three dimensional periodical structure has a photonic band gap defined by forbidden bands against the propagation of a light having a specific wavelength. If a light is generated in the photonic crystal having the photonic band gap, then the light is confined in the photonic crystal, wherein the propagation of the light is inhibited. The complete photonic band gap inhibits the three dimensional propagation of light. If the line defect is introduced into the photonic crystal having the complete photonic band gap, the line defect permits the propagation of light along the line defect in the photonic crystal. The line defect serves as the waveguide in the photonic crystal. In FIG. 1, hexagons represent lattice structures of the crystal. The photonic crystal has lattice defects aligned in a direction along arrow marks, wherein the lattice defects are represented by the absences of the hexagons. The incident light 10 represented by the arrow mark is propagated through the line defect in the photonic crystal.

Japanese laid-open patent publication No. 11-218627 discloses the following second conventional technique for stabilizing properties of the photonic crystal waveguide and reducing the manufacturing cost. The second conventional photonic crystal waveguide has a dielectric slab waveguide over a surface of a silicon substrate, wherein the dielectric slab waveguide has a matrix array of a lattice array of refractive index varying regions which are different in refractive index from a core layer of the dielectric slab waveguide. The refractive index varying regions are made of the same material as the core layer, and have been subjected to a refractive index varying treatment due to an optical induced effect. The dielectric slab waveguide comprises laminations of a bottom cladding layer, the core layer and a top cladding layer. Those lamination structure may be formed over the substrate by a metal organic chemical vapor deposition method or a liquid phase epitaxy to complete the slab waveguide over the substrate. Subsequently, the core layer is subjected to a selective irradiation through the top cladding layer with any one of an electron beam, a synchrotron orbital radiation light, a ultraviolet ray, and an infrared ray in order to cause a variation in refractive index, due to the optical induced effect, of the irradiated parts of the core layer of the slab waveguide, whereby the refractive index varying regions are formed, which are different in refractive index from the remaining non-irradiated parts of a core layer of the dielectric slab waveguide.

The above first and second conventional photonic crystal waveguides have the following disadvantages. A sectioned area of the line defect waveguide is extremely small and it is difficult to obtain a sufficient optical coupling with any external optical system. The actually available method of forming the line defect waveguide has not yet been established.

In the above circumstances, it had been required to develop a novel photonic crystal waveguide free from the above problem.

SUMMARY OF THE INVENTION

Accordingly, it is an object of the present invention to provide a novel photonic crystal waveguide free from the above problems.

It is a further object of the present invention to provide a novel photonic crystal waveguide having a high optical coupling coefficient in coupling the photonic crystal waveguide to an external optical system.

It is a still further object of the present invention to provide a novel photonic crystal waveguide which is suitable for manufacturing the same.

It is yet a further object of the present invention to provide a novel directional coupler utilizing the novel photonic crystal waveguide free from the above problems.

It is a further object of the present invention to provide a novel directional coupler utilizing the novel photonic crystal waveguide having a high optical coupling coefficient in coupling the photonic crystal waveguide to an external optical system.

It is a still further object of the present invention to provide a novel directional coupler utilizing the novel photonic crystal waveguide which is suitable for manufacturing the same.

It is yet a further object of the present invention to provide a novel directional coupler utilizing the novel directional coupler utilizing the novel photonic crystal waveguide.

It is another object of the present invention to provide a novel method of use of a novel photonic crystal waveguide free from the above problems.

It is a further object of the present invention to provide a novel method of use of a novel photonic crystal waveguide having a high optical coupling coefficient in coupling the photonic crystal waveguide to an external optical system.

It is a still further object of the present invention to provide a novel method of use of a novel photonic crystal waveguide which is suitable for manufacturing the same.

It is another object of the present invention to provide a novel method of forming a novel photonic crystal waveguide free from the above problems.

It is a further object of the present invention to provide a novel method of forming a novel photonic crystal waveguide having a high optical coupling coefficient in coupling the photonic crystal waveguide to an external optical system.

It is a still further object of the present invention to provide a novel method of forming a novel photonic crystal waveguide which is suitable for manufacturing the same.

The first present invention provides a photonic crystal waveguide comprising: a substrate; a bottom cladding layer over the substrate; and a core layer over the bottom cladding layer, the core layer having a uniform distribution of holes, wherein the core layer has at least a waveguide region which is thicker than a remaining region of the core layer to cause a refractive index guide effect.

The second present invention provides a photonic crystal waveguide comprising: a substrate; a bottom cladding layer over the substrate; and a core layer with a uniform thickness over the bottom cladding layer, the core layer having a uniform distribution of holes; wherein the core layer has at least a waveguide region, on which a dielectric pattern is provided which has a refractive index higher than a substance in contact with a top surface of the core layer.

The third present invention provides a photonic crystal waveguide comprising: a substrate; a bottom cladding layer over the substrate; and a core layer with a uniform thickness over the bottom cladding layer, the core layer having a uniform distribution of holes wherein the core layer has at least a waveguide region, and the holes except on the waveguide region are filled with an air, whilst the holes on the waveguide regions are filled with a filler material having a refractive index higher than 1.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
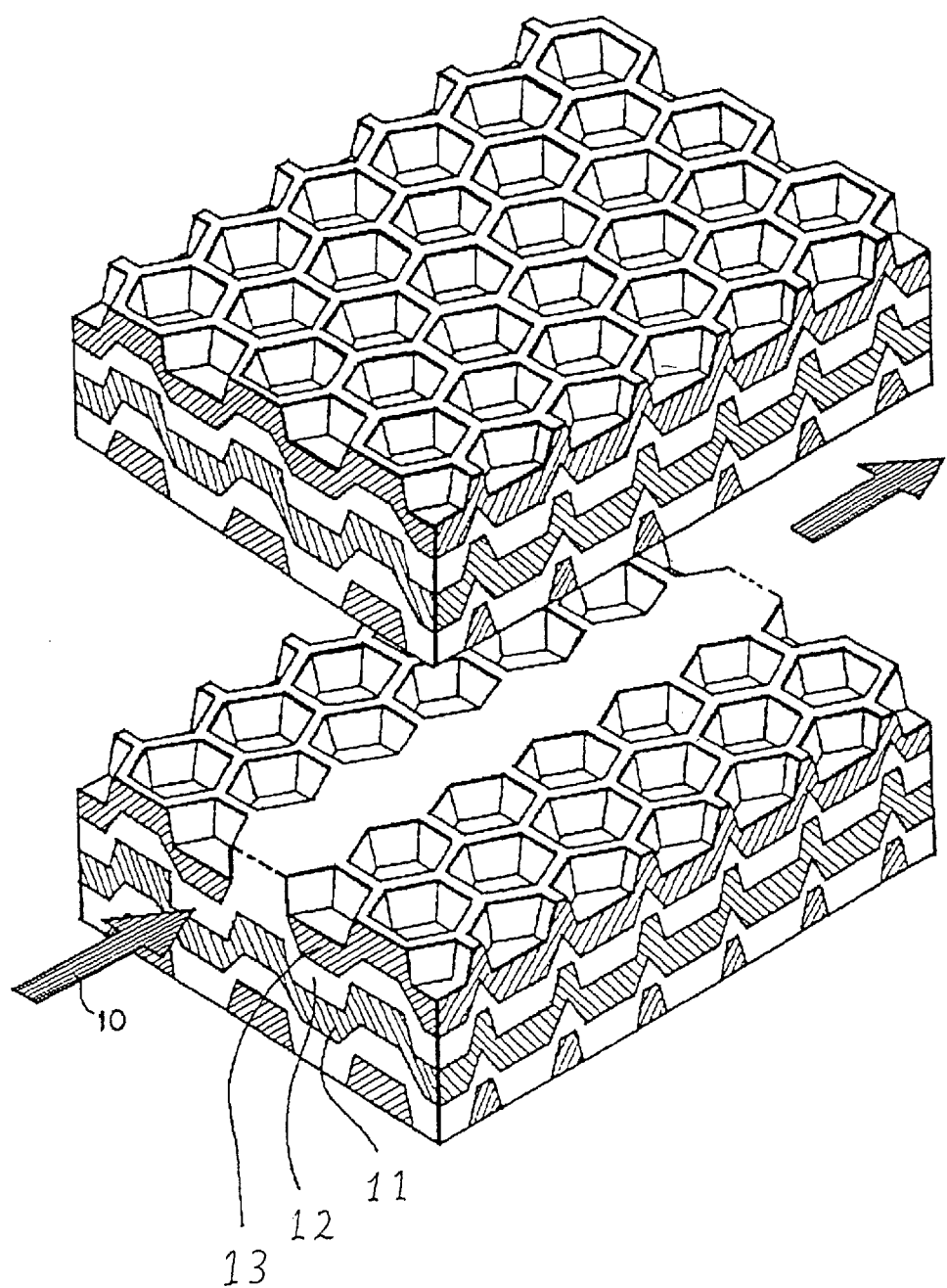
FIG. 1 is a conventional optical waveguide photonic device.

The first present invention provides a photonic crystal waveguide comprising: a substrate; a bottom cladding layer over the substrate; and a core layer over the bottom cladding layer, the core layer having a uniform distribution of holes, wherein the core layer has at least a waveguide region which is thicker than a remaining region of the core layer to cause a refractive index guide effect.

It is preferable that the waveguide region has a ridged shape.

It is also preferable that a plurality of the waveguide region extends in parallel to each other and distanced from each other to form a directional copular.

It is also preferable that the core layer is made of such a photonic crystal material that a wavelength of a light to be propagated through the waveguide region is in the vicinity of a photonic band gap edge of the photonic crystal material in order to utilize an intense dispersion phenomenon.

It is also preferable that the uniform distribution of the holes comprises a two-dimensional periodical array of through holes at a constant pitch between centers of adjacent two of the through holes.

It is also preferable that the uniform distribution of the holes comprises a three-dimensional periodical array of holes at a constant pitch between centers of adjacent two of the through holes.

It is also preferable that the holes are filled with an air.

It is also preferable to further comprise a top cladding layer over the core layer.

It is also preferable that a dielectric pattern is provided on the waveguide region, and the dielectric pattern has a refractive index higher than a substance in contact with a top surface of the core layer.

It is also preferable that the holes except on the waveguide region are filled with an air, whilst the holes on the waveguide regions are filled with a filler material having a refractive index higher than 1.

It is also preferable that a dielectric pattern is provided on the waveguide region, and the dielectric pattern has a refractive index higher than a substance in contact with a top surface of the core layer, and that the holes except on the waveguide region are filled with an air, whilst the holes on the waveguide regions are filled with a filler material having a refractive index higher than 1.

The second present invention provides a photonic crystal waveguide comprising: a substrate; a bottom cladding layer over the substrate; and a core layer with a uniform thickness over the bottom cladding layer, the core layer having a uniform distribution of holes; wherein the core layer has at least a waveguide region, on which a dielectric pattern is provided which has a refractive index higher than a substance in contact with a top surface of the core layer.

It is preferable that the substance in contact with the top surface of the core layer is an air, and the refractive index of the dielectric pattern is higher than 1.

It is also preferable to further comprise a top cladding layer over the core layer, and the top cladding layer is made of the same material as the bottom cladding layer, and the substance in contact with the top surface of the core layer is the same material as the bottom cladding layer, and the refractive index of the dielectric pattern is higher than the top cladding layer.

It is also preferable that a plurality of the waveguide region extends in parallel to each other and distanced from each other to form a directional copular.

It is also preferable that the core layer is made of such a photonic crystal material that a wavelength of a light to be propagated through the waveguide region is in the vicinity of a photonic band gap edge of the photonic crystal material in order to utilize an intense dispersion phenomenon.

It is also preferable that the uniform distribution of the holes comprises a two-dimensional periodical array of through holes at a constant pitch between centers of adjacent two of the through holes.

It is also preferable that the uniform distribution of the holes comprises a three-dimensional periodical array of holes at a constant pitch between centers of adjacent two of the through holes.

It is also preferable that the holes are filled with an air.

It is also preferable that the waveguide region is thicker than a remaining region of the core layer to cause a refractive index guide effect.

It is also preferable that the holes except on the waveguide region are filled with an air, whilst the holes on the waveguide regions are filled with a filler material having a refractive index higher than 1.

It is also preferable that the waveguide region is thicker than a remaining region of the core layer to cause a refractive index guide effect, and that the holes except on the waveguide region are filled with an air, whilst the holes on the waveguide regions are filled with a filler material having a refractive index higher than 1.

The third present invention provides a photonic crystal waveguide comprising: a substrate; a bottom cladding layer over the substrate; and a core layer with a uniform thickness over the bottom cladding layer, the core layer having a uniform distribution of holes wherein the core layer has at least a waveguide region, and the holes except on the waveguide region are filled with an air, whilst the holes on the waveguide regions are filled with a filler material having a refractive index higher than 1.

It is also preferable that a plurality of the waveguide region extends in parallel to each other and distanced from each other to form a directional copular.

It is also preferable that the core layer is made of such a photonic crystal material that a wavelength of a light to be propagated through the waveguide region is in the vicinity of a photonic band gap edge of the photonic crystal material in order to utilize an intense dispersion phenomenon.

It is also preferable that the uniform distribution of the holes comprises a two-dimensional periodical array of through holes at a constant pitch between centers of adjacent two of the through holes.

It is also preferable that the uniform distribution of the holes comprises a three-dimensional periodical array of holes at a constant pitch between centers of adjacent two of the through holes.

It is also preferable to further comprise a top cladding layer over the core layer.

It is also preferable that the filler material has a temperature coefficient which is inverse in sign to a temperature coefficient of a base material of the core layer.

It is also preferable that the waveguide region is thicker than a remaining region of the core layer to cause a refractive index guide effect.

It is also preferable that a dielectric pattern is provided on the waveguide region, and the dielectric pattern has a refractive index higher than a substance in contact with a top surface of the core layer.

It is also preferable that the waveguide region is thicker than a remaining region of the core layer to cause a refractive index guide effect, and that a dielectric pattern is provided on the waveguide region, and the dielectric pattern has a refractive index higher than a substance in contact with a top surface of the core layer.

The fourth present invention provides a directional coupler comprising a substrate; a bottom cladding layer over the substrate; and a photonic crystal core layer over the bottom cladding layer, the core layer having a uniform distribution of holes, and the core layer being made of such a photonic crystal material that a wavelength of a light to be propagated through the waveguide region is in the vicinity of a photonic band gap edge of the photonic crystal material in order to utilize an intense dispersion phenomenon; and the core layer having a pair of stripe-shaped waveguide regions which extends in parallel to each other, wherein the stripe-shaped waveguide regions are thicker than a remaining region of the core layer to cause a refractive index guide effect.

It is also preferable that the uniform distribution of the holes comprises a two-dimensional periodical array of through holes at a constant pitch between centers of adjacent two of the through holes.

It is also preferable that the uniform distribution of the holes comprises a three-dimensional periodical array of holes at a constant pitch between centers of adjacent two of the through holes.

It is also preferable to further comprise a top cladding layer over the core layer.

It is also preferable that the waveguide region has a ridged shape.

It is also preferable that the holes are filled with an air.

The fifth present invention provides a directional coupler comprising: a substrate; a bottom cladding layer over the substrate; and a photonic crystal core layer over the bottom cladding layer, the core layer having a uniform distribution of holes, and the core layer being made of such a photonic crystal material that a wavelength of a light to be propagated through the waveguide region is in the vicinity of a photonic band gap edge of the photonic crystal material in order to utilize an intense dispersion phenomenon and the core layer having a pair of stripe-shaped waveguide regions which extends in parallel to each other, wherein dielectric patterns is provided on the waveguide regions, and the dielectric patterns have a refractive index higher than a substance in contact with a top surface of the core layer.

It is also preferable that the substance in contact with the top surface of the core layer is an air, and the refractive index of the dielectric pattern is higher than 1.

It is also preferable to further comprise a top cladding layer over the core layer, and the top cladding layer is made of the same material as the bottom cladding layer, and the substance in contact with the top surface of the core layer is the same material as the bottom cladding layer, and the refractive index of the dielectric pattern is higher than the top cladding layer.

It is also preferable that the uniform distribution of the holes comprises a two-dimensional periodical array of through holes at a constant pitch between centers of adjacent two of the through holes.

It is also preferable that the uniform distribution of the holes comprises a three-dimensional periodical array of holes at a constant pitch between centers of adjacent two of the through holes.

It is also preferable that the holes are filled with an air.

The sixth present invention provides a directional coupler comprising: a substrate; a bottom cladding layer over the substrate; and a photonic crystal core layer over the bottom cladding layer, the core layer having a uniform distribution of holes, and the core layer being made of such a photonic crystal material that a wavelength of a light to be propagated through the waveguide region is in the vicinity of a photonic band gap edge of the photonic crystal material in order to utilize an intense dispersion phenomenon; and the core layer having a pair of stripe-shaped waveguide regions which extends in parallel to each other, wherein the core layer has at least a waveguide region, and the holes except on the waveguide region are filled with an air, whilst the holes on the waveguide regions are filled with a filler material having a refractive index higher than 1.

It is also preferable that the uniform distribution of the holes comprises a two-dimensional periodical array of through holes at a constant pitch between centers of adjacent two of the through holes.

It is also preferable that the uniform distribution of the holes comprises a three-dimensional periodical array of holes at a constant pitch between centers of adjacent two of the through holes.

It is also preferable to further comprise a top cladding layer over the core layer.

It is also preferable that the filler material has a temperature coefficient which is inverse in sign to a temperature coefficient of a base material of the core layer.

PREFERRED EMBODIMENT

First Embodiment

Figure 2:
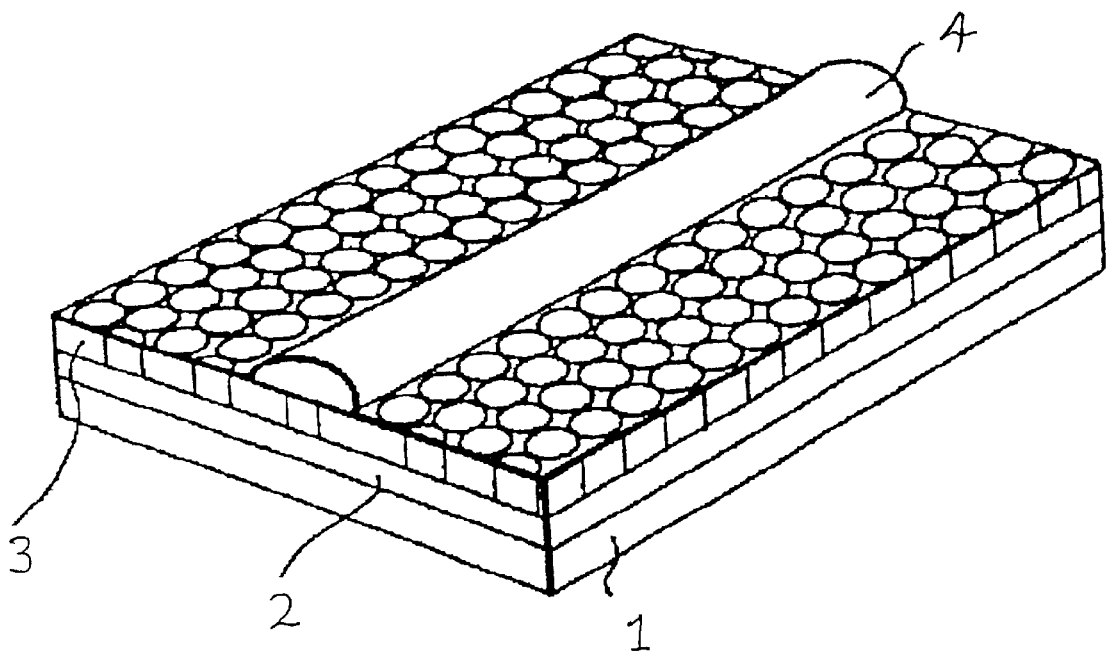
FIG. 2 is a fragmentary perspective view illustrative of a first novel photonic crystal waveguide in a first embodiment in accordance with the present invention.

A first embodiment according to the present invention will be described in detail with reference to the drawings. FIG. 2 is a fragmentary perspective view illustrative of a first novel photonic crystal waveguide in a first embodiment in accordance with the present invention. The first novel photonic crystal waveguide has a two-dimensional slab photonic crystal layered structure. This two-dimensional slab photonic crystal layered structure comprises a bottom cladding layer 2 over a silicon substrate 1 and a photonic crystal core layer 3 over the bottom cladding layer 2. The bottom cladding layer 2 is made of silicon dioxide having a refractive index of about 1.5. A top surface of the photonic crystal core layer 3 is exposed to an air. This air serves as a top cladding layer having a refractive index of 1. The silicon dioxide bottom cladding layer 2 may be laminated over the silicon substrate 1 by a self-cloning method which is disclosed in 1997, electronics letters, vol. 33, p. 1260, entitled "fabrication of sub-micrometer 3D periodic structures composed of $Si/SiO_2$". The photonic crystal core layer 3 has arrays of through holes 30 which completely penetrate the photonic crystal core layer 3 and reach the top surface of the bottom cladding layer 2, wherein the through holes 30 are distributed entirely throughout the photonic crystal core layer 3 at a center pitch in the range of 0.6–0.8 micrometers. The diameter of the through holes 30 may be about the wavelength of the propagating light. The center pitch is defined to be a distance between centers of adjacent two of the distributed through holes 30. The through holes 30 have a diameter of about 0.5 micrometers. The distribution of the through holes 30 may comprise a two-dimensional periodical array, for example, in the form of square-lattice, triangle-lattice or hexagonal-lattice.

In this case, an averaged refractive index of the photonic crystal layer is approximately 2. In view of both the optical confinement and the coupling coefficient with the external optical system, it is preferable that the silicon dioxide bottom cladding layer 2 and the photonic crystal core layer 3 have a thickness of about 2 micrometers. A resist is applied on the top surface of the photonic crystal core layer 3. The resist is then patterned by lithography processes to form a stripe-shaped resist pattern 4 on a waveguide region of the photonic crystal core layer 3. In the slab photonic crystal waveguide, the waveguide region covered by the stripe-shaped resist pattern 4 is higher in equivalent refractive index than the remaining part of the photonic crystal core layer 3. A light is confined in the region which is higher in equivalent refractive index than the surrounding region of the photonic crystal core layer 3, for which reason the light is confined in the waveguide region which is higher in equivalent refractive index than the remaining part of the photonic crystal core layer 3. Accordingly, the waveguide region higher in equivalent refractive index serves as an optical waveguide. The width of the stripe-shaped resist pattern 4 defines a width of the optical waveguide. In view of both the optical confinement and the coupling coefficient with the external optical system, it is preferable that the width of the stripe-shaped resist pattern 4 is about 2 micrometers, so that the width of the optical waveguide is about 2 micrometers. As described above, the preferable thickness of the photonic crystal core layer 3 is also 2 micrometers. Thus, the optical waveguide has a square-sectioned area of 2 micrometers×2 micrometers, which is much larger than the above conventional line defect optical waveguide. This large sectioned area of the optical waveguide is suitable for obtaining a high optical coupling coefficient to the external optical system.

In accordance with the first novel two-dimensional slab-structured photonic crystal waveguide, in place of the conventional line defect optical waveguide, the resist pattern 4 is provided for defining the optical waveguide in the photonic crystal core layer 3, so as to obtain a large sectioned area of the optical waveguide for obtaining a desired high optical coupling coefficient to the external optical system.

The propagation of the optical wave is not inhibited outside the photonic band of the photonic crystal. In the vicinity of the photonic band edge of the photonic crystal, however, a dispersion is extremely large and a group velocity is extremely low, for which reason if a wavelength of a propagating light is close to the photonic band edge of the photonic crystal, then this makes it possible to apply this novel photonic crystal waveguide to various optical devices such as an optical dispersion-compensating device, an optical pulse compression device and an optical delay circuit.

In this embodiment, the novel photonic crystal waveguide is made of the $Si/SiO_2$ based materials over the silicon substrate. It is, of course, possible that the novel photonic crystal waveguide is made of other materials, for example, AlGaAs based materials over a GaAs substrate, and InGaAsP based materials over an InP substrate.

In this embodiment, the top cladding layer comprises an air having a reflective index of 1. It is, of course, possible to further provide a top cladding layer of the same material as the bottom cladding layer to provide a three-dimensional photonic crystal layered structure.

Second Embodiment

Figure 3:
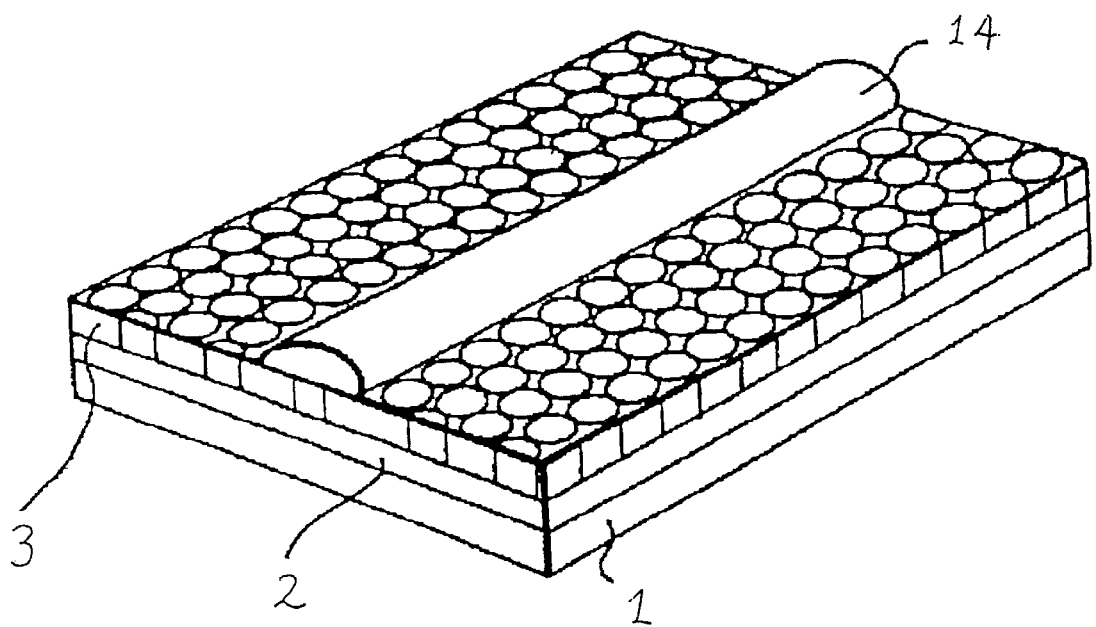
FIG. 3 is a fragmentary perspective view illustrative of a second novel photonic crystal waveguide in a second embodiment in accordance with the present invention.

A second embodiment according to the present invention will be described in detail with reference to the drawings. FIG. 3 is a fragmentary perspective view illustrative of a second novel photonic crystal waveguide in a second embodiment in accordance with the present invention.

In the above first embodiment, the resist pattern 4 is provided. This resist pattern 4, however, shows an optical absorption which cases a propagation loss. Notwithstanding, if the length of the optical waveguide in the optical propagation direction is not so long, then a propagation loss by the resist pattern 4 is not problem.

In this second embodiment, in place of the resist pattern 4, a dielectric pattern 14 of other dielectric material than the resist material is provided on the optical waveguide region, wherein the dielectric pattern 14 is lower in optical absorption coefficient than the resist material. The dielectric pattern 14 may be made of silicon dioxide. Since the second novel photonic crystal waveguide uses the dielectric pattern 14 to suppress the optical absorption for reducing the propagation loss. Even if the length of the optical waveguide in the optical propagation direction is long, then the propagation loss by the dielectric pattern 14 is not problem. The second novel photonic crystal waveguide is structurally different in the dielectric pattern 14 from the above described first novel photonic crystal waveguide.

The second novel photonic crystal waveguide has a two-dimensional slab photonic crystal layered structure. This two-dimensional slab photonic crystal layered structure comprises a bottom cladding layer 2 over a silicon substrate 1 and a photonic crystal core layer 3 over the bottom cladding layer 2. The bottom cladding layer 2 is made of silicon dioxide having a refractive index of about 1.5. A top surface of the photonic crystal core layer 3 is exposed to an air. This air serves as a top cladding layer having a refractive index of 1. The photonic crystal core layer 3 has arrays of through holes 30 which completely penetrate the photonic crystal core layer 3 and reach the top surface of the bottom cladding layer 2, wherein the through holes 30 are distributed entirely throughout the photonic crystal core layer 3 at a center pitch in the range of 0.6–0.8 micrometers. The diameter of the through holes 30 may be about the wavelength of the propagating light. The center pitch is defined to be a distance between centers of adjacent two of the distributed through holes 30. The through holes 30 have a diameter of about 0.5 micrometers. The distribution of the through holes 30 may comprise a two-dimensional periodical array, for example, in the form of square-lattice, triangle-lattice or hexagonal-lattice.

In this case, an averaged refractive index of the photonic crystal layer is approximately 2. In view of both the optical confinement and the coupling coefficient with the external optical system, it is preferable that the silicon dioxide bottom cladding layer 2 and the photonic crystal core layer 3 have a thickness of about 2 micrometers. A dielectric layer is entirely formed over the top surface of the photonic crystal core layer 3, wherein the dielectric layer is made of a dielectric material lower in optical absorption coefficient than a resist material. A resist is further applied on the top surface of the dielectric layer. The resist is then patterned by lithography processes to form a stripe-shaped resist mask over a waveguide region of the photonic crystal core layer 3. The stripe-shaped resist mask is used for a selective anisotropic etching to the dielectric layer to form a stripe-shaped dielectric pattern 14 on the waveguide region of the photonic crystal core layer 3. The used stripe-shaped resist mask is removed. In the slab photonic crystal waveguide, the waveguide region covered by the stripe-shaped dielectric pattern 14 is higher in equivalent refractive index than the remaining part of the photonic crystal core layer 3. A light is confined in the region which is higher in equivalent refractive index than the surrounding region of the photonic crystal core layer 3, for which reason the light is confined in the waveguide region which is higher in equivalent refractive index than the remaining part of the photonic crystal core layer 3. Accordingly, the waveguide region higher in equivalent refractive index serves as an optical waveguide. The width of the stripe-shaped dielectric pattern 14 defines a width of the optical waveguide. In view of both the optical confinement and the coupling coefficient with the external optical system, it is preferable that the width of the stripe-shaped dielectric pattern 14 is about 2 micrometers, so that the width of the optical waveguide is about 2 micrometers. As described above, the preferable thickness of the photonic crystal core layer 3 is also 2 micrometers. Thus, the optical waveguide has a square-sectioned area of 2 micrometers×2 micrometers, which is much larger than the above conventional line defect optical waveguide. This large sectioned area of the optical waveguide is suitable for obtaining a high optical coupling coefficient to the external optical system.

In accordance with the second novel two-dimensional slab-structured photonic crystal waveguide, in place of the conventional line defect optical waveguide, the dielectric pattern 14 is provided for defining the optical waveguide in the photonic crystal core layer 3, so as to obtain a large sectioned area of the optical waveguide for obtaining a desired high optical coupling coefficient to the external optical system.

In this second embodiment, in place of the resist pattern 4, a dielectric pattern 14 of other dielectric material than the resist material is provided on the optical waveguide region, wherein the dielectric pattern 14 is lower in optical absorption coefficient than the resist material. The dielectric pattern 14 may be made of silicon dioxide. Since the second novel photonic crystal waveguide uses the dielectric pattern 14 to suppress the optical absorption for reducing the propagation loss. Even if the length of the optical waveguide in the optical propagation direction is long, then the propagation loss by the dielectric pattern 14 is not problem.

The propagation of the optical wave is not inhibited outside the photonic band of the photonic crystal. In the vicinity of the photonic band edge of the photonic crystal, however, a dispersion is extremely large and a group velocity is extremely low, for which reason if a wavelength of a propagating light is close to the photonic band edge of the photonic crystal, then this makes it possible to apply this novel photonic crystal waveguide to various optical devices such as an optical dispersion-compensating device, an optical pulse compression device and an optical delay circuit.

In this embodiment, the novel photonic crystal waveguide is made of the Si/SiO$_2$ based materials over the silicon substrate. It is, of course, possible that the novel photonic crystal waveguide is made of other materials, for example, AlGaAs based materials over a GaAs substrate, and InGaAsP based materials over an InP substrate.

In this embodiment, the top cladding layer comprises an air having a reflective index of 1. It is, of course, possible to further provide a top cladding layer of the same material as the bottom cladding layer to provide a three-dimensional photonic crystal layered structure.

Third Embodiment

Figure 4:
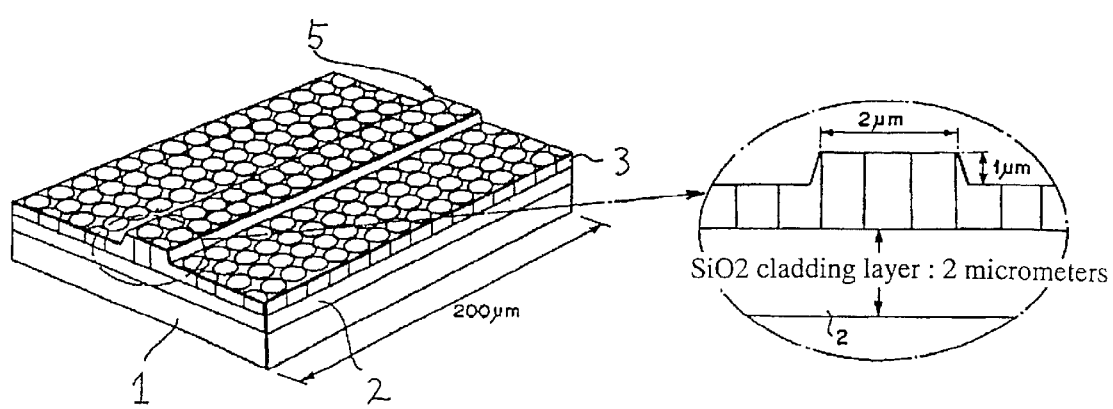
FIG. 4 is a fragmentary perspective view illustrative of a third novel photonic crystal waveguide in a third embodiment in accordance with the present invention.

A third embodiment according to the present invention will be described in detail with reference to the drawings. FIG. 4 is a fragmentary perspective view illustrative of a third novel photonic crystal waveguide in a third embodiment in accordance with the present invention. The third novel photonic crystal waveguide has a photonic crystal layered structure with a ridged optical waveguide. This photonic crystal layered structure comprises a bottom cladding layer 2 over a silicon substrate 1 and a photonic crystal core layer 3 over the bottom cladding layer 2. The bottom cladding layer 2 is made of silicon dioxide having a refractive index of about 1.5. A top surface of the photonic crystal core layer 3 is exposed to an air. This air serves as a top cladding layer having a refractive index of 1. The photonic crystal core layer 3 has a ridge-formed thicker portion 5 which is thicker than the remaining part of the photonic crystal core layer 3, wherein the ridge-formed thicker portion 5 extends on the waveguide region. A light is confined in the ridge-formed thicker portion 5 of the photonic crystal core layer 3. The photonic crystal core layer 3 has arrays of through holes 30 which completely penetrate the photonic crystal core layer 3 and reach the top surface of the bottom cladding layer 2, wherein the through holes 30 are distributed entirely throughout the photonic crystal core layer 3 at a center pitch in the range of 0.6–0.8 micrometers. The diameter of the through holes 30 may be about the wavelength of the propagating light. The center pitch is defined to be a distance between centers of adjacent two of the distributed through holes 30. The through holes 30 have a diameter of about 0.5 micrometers. The distribution of the through holes 30 may comprise a two-dimensional periodical array, for example, in the form of square-lattice, triangle-lattice or hexagonal-lattice.

In this case, an averaged refractive index of the photonic crystal layer is approximately 2. In view of both the optical confinement and the coupling coefficient with the external optical system, it is preferable that the silicon dioxide bottom cladding layer 2 has a thickness of about 2 micrometers and the ridge-formed thicker portion 5 of the photonic crystal core layer 3 has a thickness of 2 micrometers and the remaining portions of the photonic crystal core layer 3 has a thickness of 1 micrometer.

Accordingly, the ridge-formed thicker portion 5 of the photonic crystal core layer 3 serves as an optical waveguide. The width of the ridge-formed thicker portion 5 defines a width of the optical waveguide. In view of both the optical confinement and the coupling coefficient with the external optical system, it is preferable that the width of the ridge-formed thicker portion 5 is about 2 micrometers, so that the width of the optical waveguide is about 2 micrometers. As described above, the preferable thickness of the ridge-formed thicker portion 5 of the photonic crystal core layer 3 is also 2 micrometers. Thus, the optical waveguide has a square-sectioned area of 2 micrometers×2 micrometers, which is much larger than the above conventional line defect optical waveguide. This large sectioned area of the optical waveguide is suitable for obtaining a high optical coupling coefficient to the external optical system.

Figure 5A:
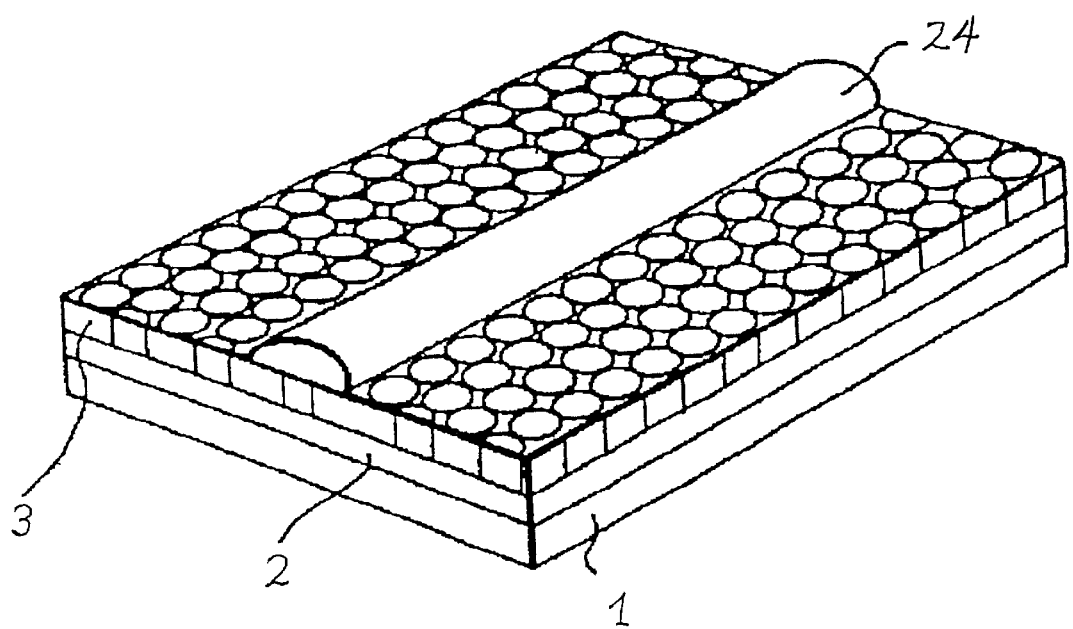
FIGS. 5A through 5C are fragmentary perspective views illustrative of the third novel photonic crystal waveguides in sequential steps involved in the fabrication method therefor in the third embodiment in accordance with the present invention.
Figure 5B:
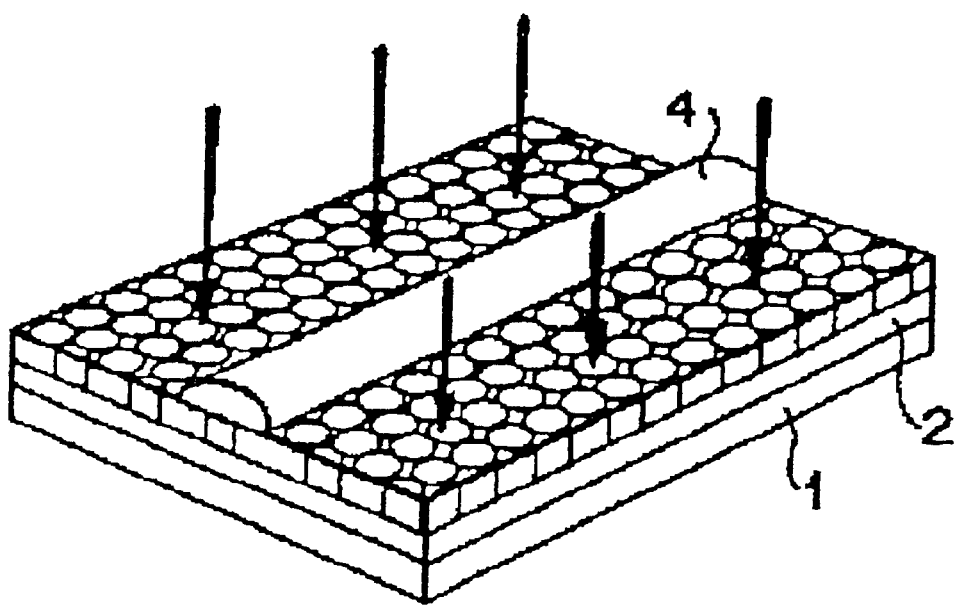
Figure 5C:
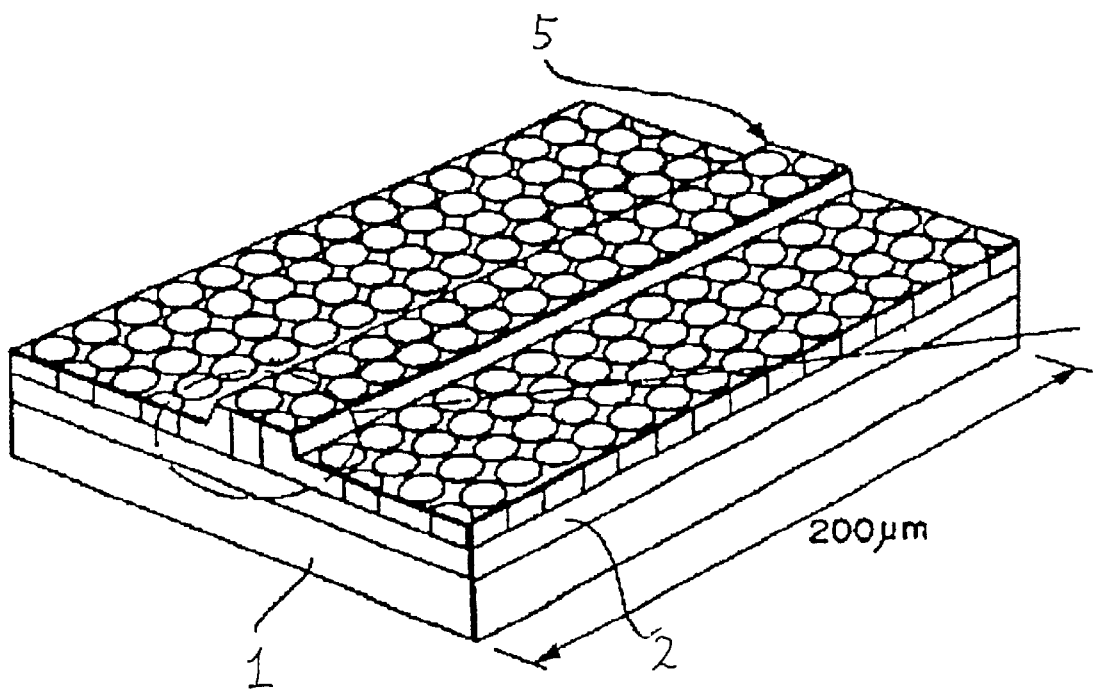

FIGS. 5A through 5C are fragmentary perspective views illustrative of the third novel photonic crystal waveguides in sequential steps involved in the fabrication method therefor in the third embodiment in accordance with the present invention.

With reference to FIG. 5A, a resist is applied on the top surface of the photonic crystal core layer 3. The resist is then patterned by lithography processes to form a stripe-shaped resist pattern 4 on the waveguide region of the photonic crystal core layer 3, wherein the photonic crystal core layer 3 has a uniform thickness, for example, of 2 micrometers.

With reference to FIG. 5B, a dry etching process is then carried out by use of the stripe-shaped resist pattern 4 as a mask for selectively etching the photonic crystal core layer 3, so that the thickness of the photonic crystal core layer 3 is reduced to 1 micrometer, except under the stripe-shaped resist pattern 4. As a result, the ridge-formed thicker portion 5 is formed under the stripe-shaped resist pattern 4.

With reference to FIG. 5C, the used stripe-shaped resist pattern 4 is removed. The photonic crystal core layer 3 has the ridge-formed thicker portion 5 which has a thickness of 2 micrometers, whilst the remaining etched part of the photonic crystal core layer 3 has a thickness of 1 micrometer.

The photonic crystal structure also extends around the optical waveguide comprising the ridge-formed thicker portion 5 of the photonic crystal core layer 3. This photonic crystal structure around the optical waveguide suppress a leakage of an optical wave from the optical waveguide. This means that the third novel photonic crystal waveguide is highly responsible to the requirement for abrupt vent or curve of the optical path.

In accordance with the third novel photonic crystal waveguide, ridge-formed thicker portion 5 is provided for defining the optical waveguide in the photonic crystal core layer 3, so as to obtain a large sectioned area of the optical waveguide for obtaining a desired high optical coupling coefficient to the external optical system.

The propagation of the optical wave is not inhibited outside the photonic band of the photonic crystal. In the vicinity of the photonic band edge of the photonic crystal, however, a dispersion is extremely large and a group velocity is extremely low, for which reason if a wavelength of a propagating light is close to the photonic band edge of the photonic crystal, then this makes it possible to apply this novel photonic crystal waveguide to various optical devices such as an optical dispersion-compensating device, an optical pulse compression device and an optical delay circuit.

In this embodiment, the novel photonic crystal waveguide is made of the Si/SiO$_2$ based materials over the silicon substrate. It is, of course, possible that the novel photonic crystal waveguide is made of other materials, for example, AlGaAs based materials over a GaAs substrate, and InGaAsP based materials over an InP substrate.

In this embodiment, the top cladding layer comprises an air having a reflective index of 1. It is, of course, possible to further provide a top cladding layer of the same material as the bottom cladding layer to provide a three-dimensional photonic crystal layered structure.

Fourth Embodiment

Figure 6:
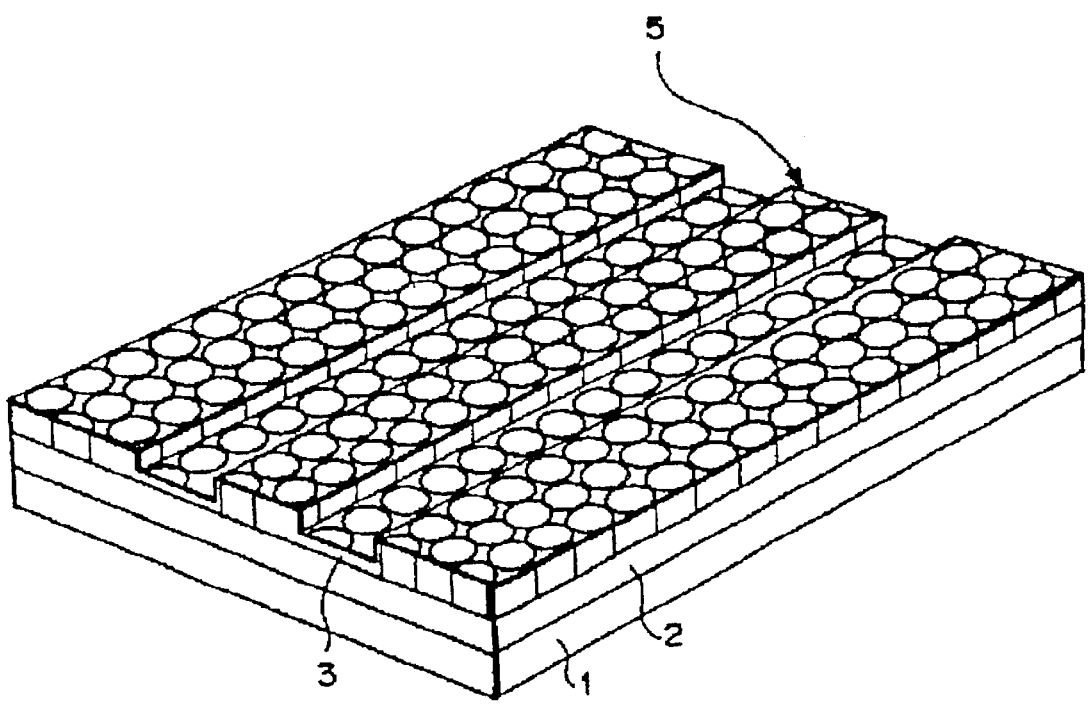
FIG. 6 is a fragmentary perspective view illustrative of a fourth novel photonic crystal waveguide in a fourth embodiment in accordance with the present invention.

A fourth embodiment according to the present invention will be described in detail with reference to the drawings. FIG. 6 is a fragmentary perspective view illustrative of a fourth novel photonic crystal waveguide in a fourth embodiment in accordance with the present invention. The fourth novel photonic crystal waveguide has a photonic crystal layered structure with a ridged optical waveguide. This photonic crystal layered structure comprises a bottom cladding layer 2 over a silicon substrate 1 and a photonic crystal core layer 3 over the bottom cladding layer 2. The bottom cladding layer 2 is made of silicon dioxide having a refractive index of about 1.5. A top surface of the photonic crystal core layer 3 is exposed to an air. This air serves as a top cladding layer having a refractive index of 1. The photonic crystal core layer 3 has a ridge-formed thicker portion 5 which is defined by double channel regions, wherein the ridge-formed thicker portion 5 is thicker than the double channel regions of the photonic crystal core layer 3. The ridge-formed thicker portion 5 extends on the waveguide region, whilst the double channel regions extend opposite longitudinal sides of the ridge-formed thicker portion 5. A light is confined in the ridge-formed thicker portion 5 of the photonic crystal core layer 3. The photonic crystal core layer 3 has arrays of through holes 30 which completely penetrate the photonic crystal core layer 3 and reach the top surface of the bottom cladding layer 2, wherein the through holes 30 are distributed entirely throughout the photonic crystal core layer 3 at a center pitch in the range of 0.6–0.8 micrometers. The diameter of the through holes 30 may be about the wavelength of the propagating light. The center pitch is defined to be a distance between centers of adjacent two of the distributed through holes 30. The through holes 30 have a diameter of about 0.5 micrometers. The distribution of the through holes 30 may comprise a two-dimensional periodical array, for example, in the form of square-lattice, triangle-lattice or hexagonal-lattice.

In this case, an averaged refractive index of the photonic crystal layer is approximately 2. In view of both the optical confinement and the coupling coefficient with the external optical system, it is preferable that the silicon dioxide bottom cladding layer 2 has a thickness of about 2 micrometers and the ridge-formed thicker portion 5 of the photonic crystal core layer 3 has a thickness of 2 micrometers and the double channel regions of the photonic crystal core layer 3 has a thickness of 1 micrometer.

Accordingly, the ridge-formed thicker portion 5 of the photonic crystal core layer 3 serves as an optical waveguide. The width of the ridge-formed thicker portion 5 defines a width of the optical waveguide. In view of both the optical confinement and the coupling coefficient with the external optical system, it is preferable that the width of the ridge-formed thicker portion 5 is about 2 micrometers, so that the width of the optical waveguide is about 2 micrometers. As described above, the preferable thickness of the ridge-formed thicker portion 5 of the photonic crystal core layer 3 is also 2 micrometers. Thus, the optical waveguide has a square-sectioned area of 2 micrometers×2 micrometers, which is much larger than the above conventional line defect optical waveguide. This large sectioned area of the optical waveguide is suitable for obtaining a high optical coupling coefficient to the external optical system.

Figure 7A:
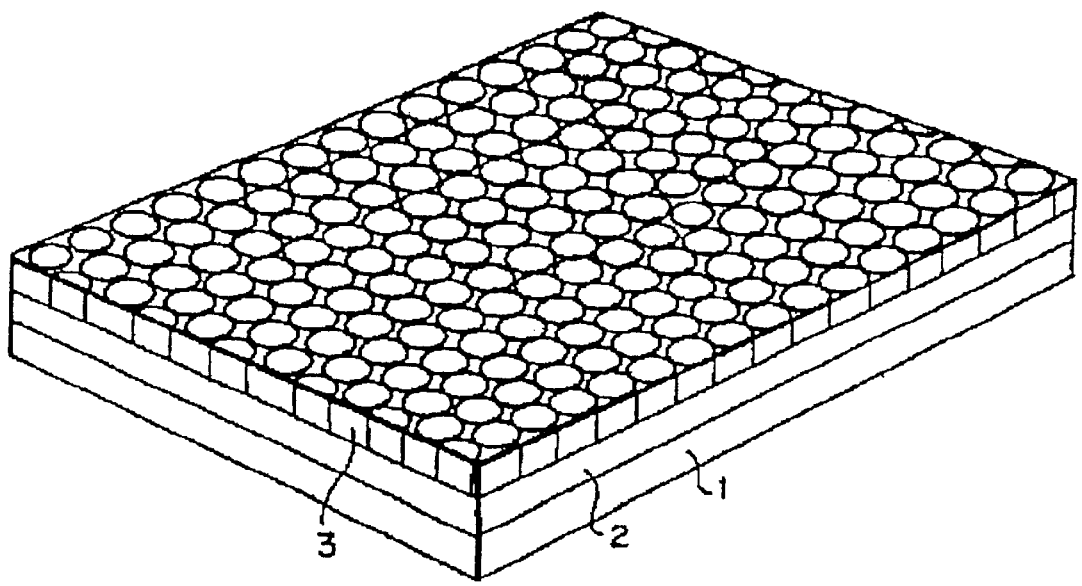
FIGS. 7A through 7C are fragmentary perspective views illustrative of the fourth novel photonic crystal waveguides in sequential steps involved in the fabrication method therefor in the fourth embodiment in accordance with the present invention.
Figure 7B:
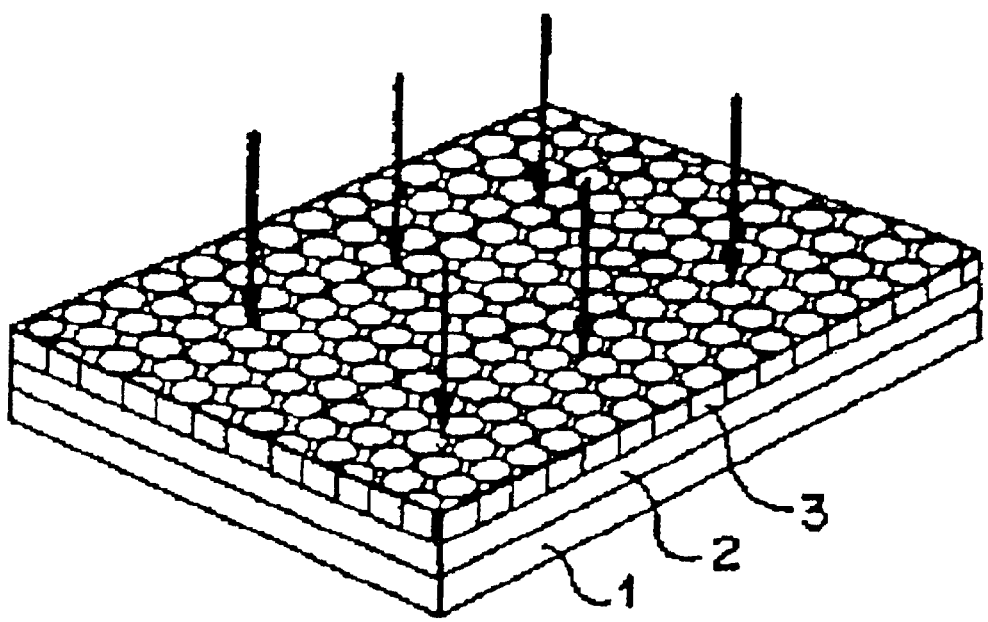
Figure 7C:
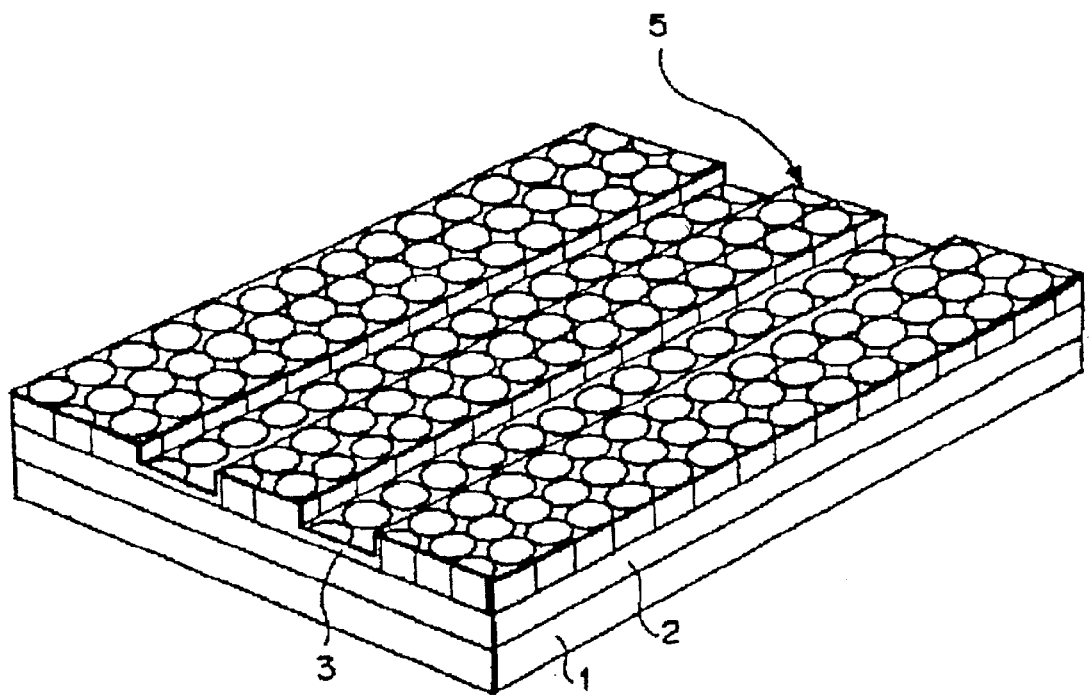

FIGS. 7A through 7C are fragmentary perspective views illustrative of the fourth novel photonic crystal waveguides in sequential steps involved in the fabrication method therefor in the fourth embodiment in accordance with the present invention.

With reference to FIG. 7A, the bottom cladding layer 2 is formed over the silicon substrate 1. The photonic crystal core layer 3 is formed over the bottom cladding layer 2, wherein the photonic crystal core layer 3 has a uniform thickness, for example, of 2 micrometers.

With reference to FIG. 7B, a focused ion beam is irradiated on selected double channel regions of the photonic crystal core layer 3 for selectively etching the photonic crystal core layer 3, so that the thickness of the double channel regions of the photonic crystal core layer 3 is reduced to 1 micrometer.

With reference to FIG. 7C, the ridge-formed thicker portion 5 is formed which is defined between the thickness-reduced double channel regions of the photonic crystal core layer 3. The photonic crystal core layer 3 has the ridge-formed thicker portion 5 which has a thickness of 2 micrometers, whilst the double channel regions of the photonic crystal core layer 3 have a thickness of 1 micrometer.

The photonic crystal structure also extends around the optical waveguide comprising the ridge-formed thicker portion 5 of the photonic crystal core layer 3. This photonic crystal structure around the optical waveguide suppress a leakage of an optical wave from the optical waveguide. This means that the fourth novel photonic crystal waveguide is highly responsible to the requirement for abrupt vent or curve of the optical path. The etched area of the photonic crystal core layer 3 is smaller than what is described in the above third embodiment. The focus ion beam process makes it unnecessary to carry out the lithography process made in the above third embodiment.

In accordance with the fourth novel photonic crystal waveguide, ridge-formed thicker portion 5 is provided for defining the optical waveguide in the photonic crystal core layer 3, so as to obtain a large sectioned area of the optical waveguide for obtaining a desired high optical coupling coefficient to the external optical system.

The propagation of the optical wave is not inhibited outside the photonic band of the photonic crystal. In the vicinity of the photonic band edge of the photonic crystal, however, a dispersion is extremely large and a group velocity is extremely low, for which reason if a wavelength of a propagating light is close to the photonic band edge of the photonic crystal, then this makes it possible to apply this novel photonic crystal waveguide to various optical devices such as an optical dispersion-compensating device, an optical pulse compression device and an optical delay circuit.

In this embodiment, the novel photonic crystal waveguide is made of the $Si/SiO_2$ based materials over the silicon substrate. It is, of course, possible that the novel photonic crystal waveguide is made of other materials, for example, AlGaAs based materials over a GaAs substrate, and InGaAsP based materials over an InP substrate.

Fifth Embodiment

Figure 8:
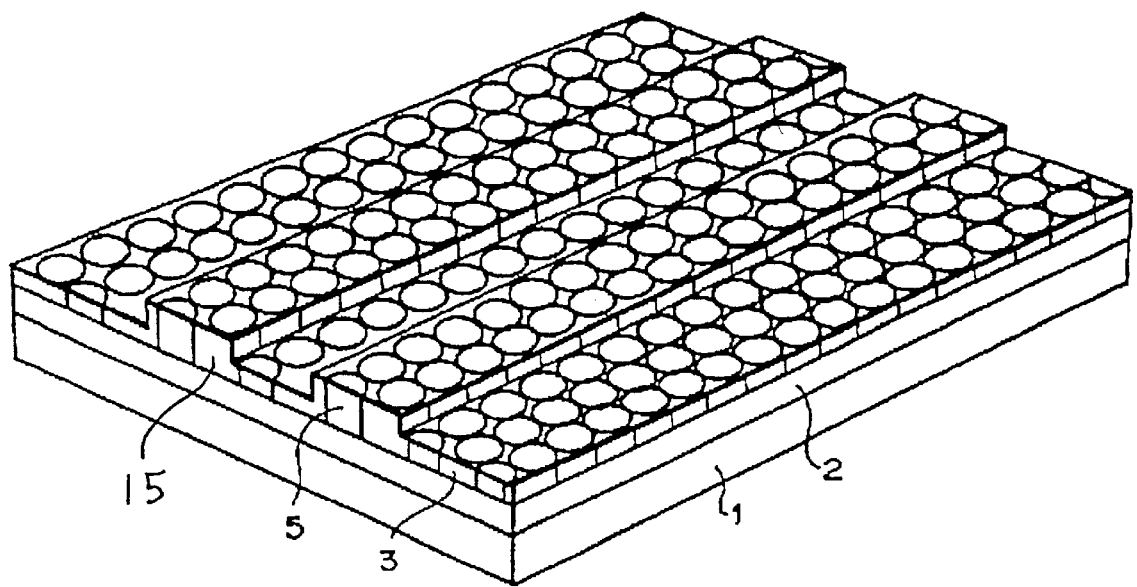
FIG. 8 is a fragmentary perspective view illustrative of a fifth novel photonic crystal waveguide to be used as a directional coupler in a fifth embodiment in accordance with the present invention.
Figure 9:
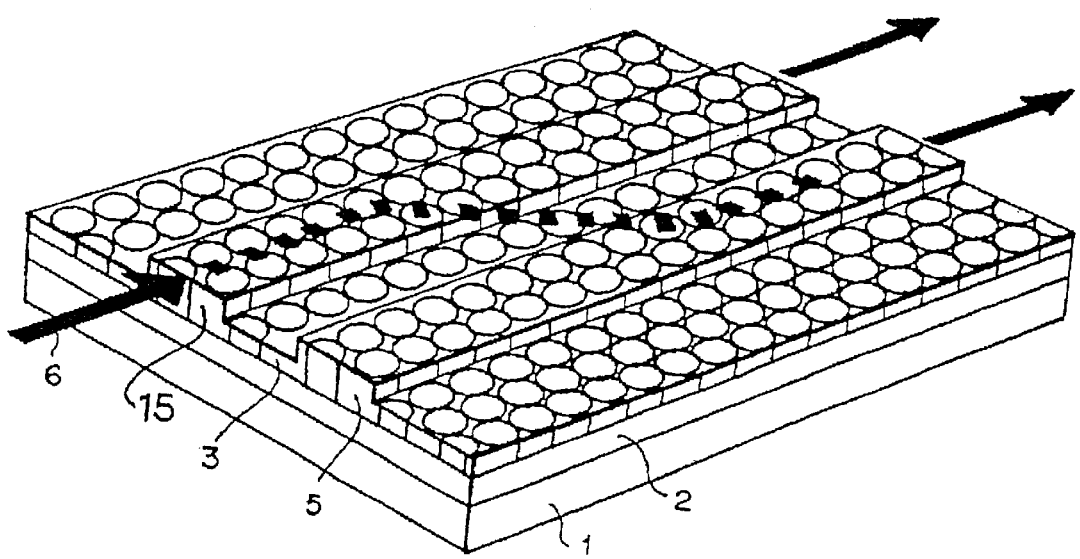
FIG. 9 is a fragmentary perspective view illustrative of the fifth novel photonic crystal waveguide of FIG. 8 in use.

A fifth embodiment according to the present invention will be described in detail with reference to the drawings. FIG. 8 is a fragmentary perspective view illustrative of a fifth novel photonic crystal waveguide to be used as a directional coupler in a fifth embodiment in accordance with the present invention. FIG. 9 is a fragmentary perspective view illustrative of the fifth novel photonic crystal waveguide of FIG. 8 in use. The fifth novel photonic crystal waveguide has a photonic crystal layered structure with a double-ridged optical waveguide structure. This photonic crystal layered structure comprises a bottom cladding layer 2 over a silicon substrate 1 and a photonic crystal core layer 3 over the bottom cladding layer 2. The bottom cladding layer 2 is made of silicon dioxide having a refractive index of about 1.5. A top surface of the photonic crystal core layer 3 is exposed to an air. This air serves as a top cladding layer having a refractive index of 1. The photonic crystal core layer 3 has double ridge-formed thicker portions 15 and 5, for example, a main ridge-formed thicker portion 5 and a subordinate ridge-formed thicker portion 15. The main and subordinate ridge-formed thicker portions 15 and 5 extend in parallel to each other and are distanced at a constant pitch. The main and subordinate ridge-formed thicker portions 15 and 5 are thicker than the remaining portions of the photonic crystal core layer 3. The main and subordinate ridge-formed thicker portions 15 and 5 extend on the main and subordinate waveguide regions. A light is confined in either one of the main and subordinate waveguide regions comprising the main and subordinate ridge-formed thicker portions 15 and 5 of the photonic crystal core layer 3. A velocity of the light in either one of the main and subordinate waveguide regions comprising the main and subordinate ridge-formed thicker portions 15 and 5 of the photonic crystal core layer 3 is much smaller than that of the conventional directional coupler with the ridged waveguides made of other material than the photonic crystal. This allows a remarkable size reduction of the novel directional coupler using the photonic crystal. A light may be incident into one of the main and subordinate waveguide regions 15 and 5. A part of the incident light is introduced into another of the main and subordinate waveguide regions 15 and 5, whilst the remaining part of the incident light remains propagated through the incident one of the main and subordinate waveguide regions 15 and 5. The photonic crystal core layer 3 has arrays of through holes 30 which completely penetrate the photonic crystal core layer 3 and reach the top surface of the bottom cladding layer 2, wherein the through holes 30 are distributed entirely throughout the photonic crystal core layer 3 at a center pitch in the range of 0.6–0.8 micrometers. The diameter of the through holes 30 may be about the wavelength of the propagating light. The center pitch is defined to be a distance between centers of adjacent two of the distributed through holes 30. The through holes 30 have a diameter of about 0.5 micrometers. The distribution of the through holes 30 may comprise a two-dimensional periodical array, for example, in the form of square-lattice, triangle-lattice or hexagonal-lattice.

In this case, an averaged refractive index of the photonic crystal layer is approximately 2. In view of both the optical confinement and the coupling coefficient with the external optical system, it is preferable that the silicon dioxide bottom cladding layer 2 has a thickness of about 2 micrometers and the main and subordinate ridge-formed thicker portions 15 and 5 of the photonic crystal core layer 3 have a thickness of 2 micrometers and the remaining region of the photonic crystal core layer 3 has a thickness of 1 micrometer.

Accordingly, the main and subordinate ridge-formed thicker portions 15 and 5 of the photonic crystal core layer 3 serve as the main and subordinate optical waveguides. The widths of the main and subordinate ridge-formed thicker portions 15 and 5 defines widths of the main and subordinate optical waveguides. In view of both the optical confinement and the coupling coefficient with the external optical system, it is preferable that the widths of the main and subordinate ridge-formed thicker portions 15 and 5 are about 2 micrometers, so that the widths of the main and subordinate optical waveguides are about 2 micrometers. As described above, the preferable thickness of the main and subordinate ridge-formed thicker portions 15 and 5 of the photonic crystal core layer 3 is also 2 micrometers. Thus, each of the main and subordinate optical waveguides has a square-sectioned area of 2 micrometers×2 micrometers, which is much larger than the above conventional line defect optical waveguide. This large sectioned area of the optical waveguide is suitable for obtaining a high optical coupling coefficient to the external optical system.

Accordingly the use of the photonic crystal for the directional coupler allows the remarkable size reduction of the directional coupler.

In this embodiment, the novel photonic crystal waveguide is made of the Si/SiO$_2$ based materials over the silicon substrate. It is, of course, possible that the novel photonic crystal waveguide is made of other materials, for example, AlGaAs based materials over a GaAs substrate, and InGaAsP based materials over an InP substrate.

In this embodiment, the top cladding layer comprises an air having a reflective index of 1. It is, of course, possible to further provide a top cladding layer of the same material as the bottom cladding layer to provide a three-dimensional photonic crystal layered structure.

Sixth Embodiment

Figure 10:
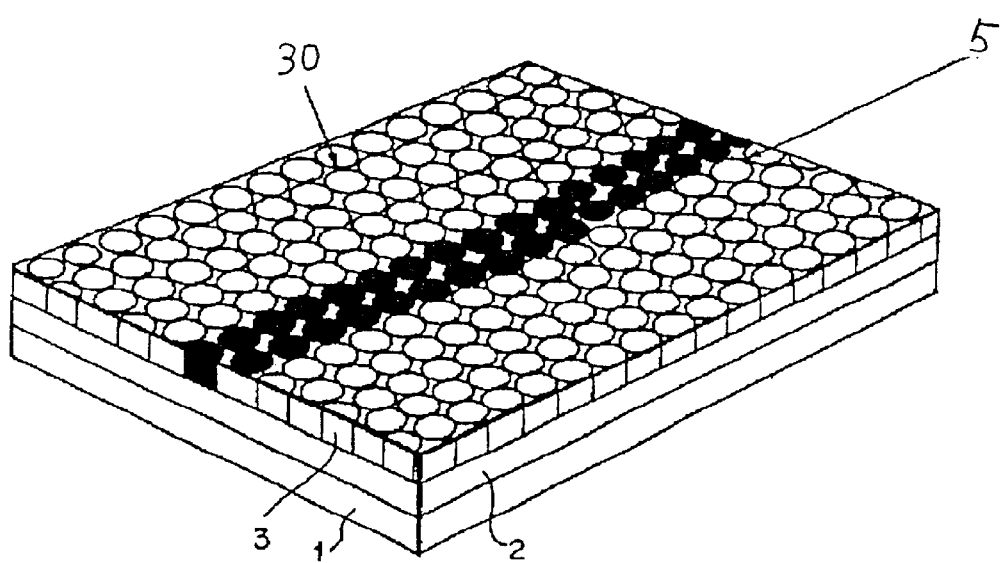
FIG. 10 is a fragmentary perspective view illustrative of a sixth novel photonic crystal waveguide in a sixth embodiment in accordance with the present invention.
Figure 11:
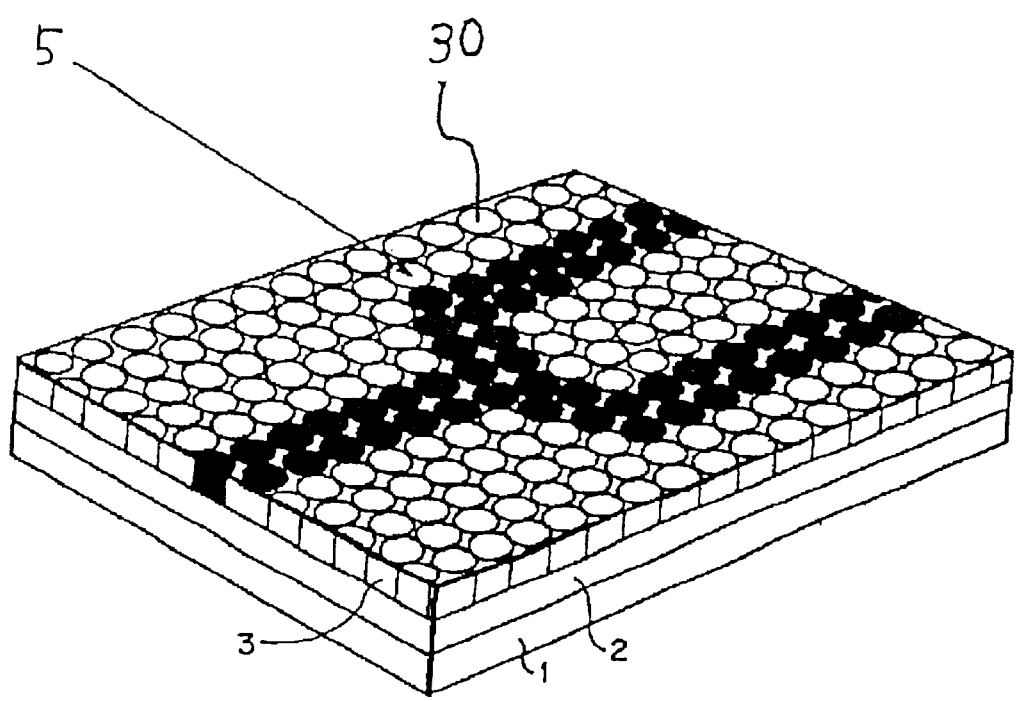
FIG. 11 is a fragmentary perspective view illustrative of a seventh novel photonic crystal waveguide in this sixth embodiment in accordance with the present invention.
Figure 12A:
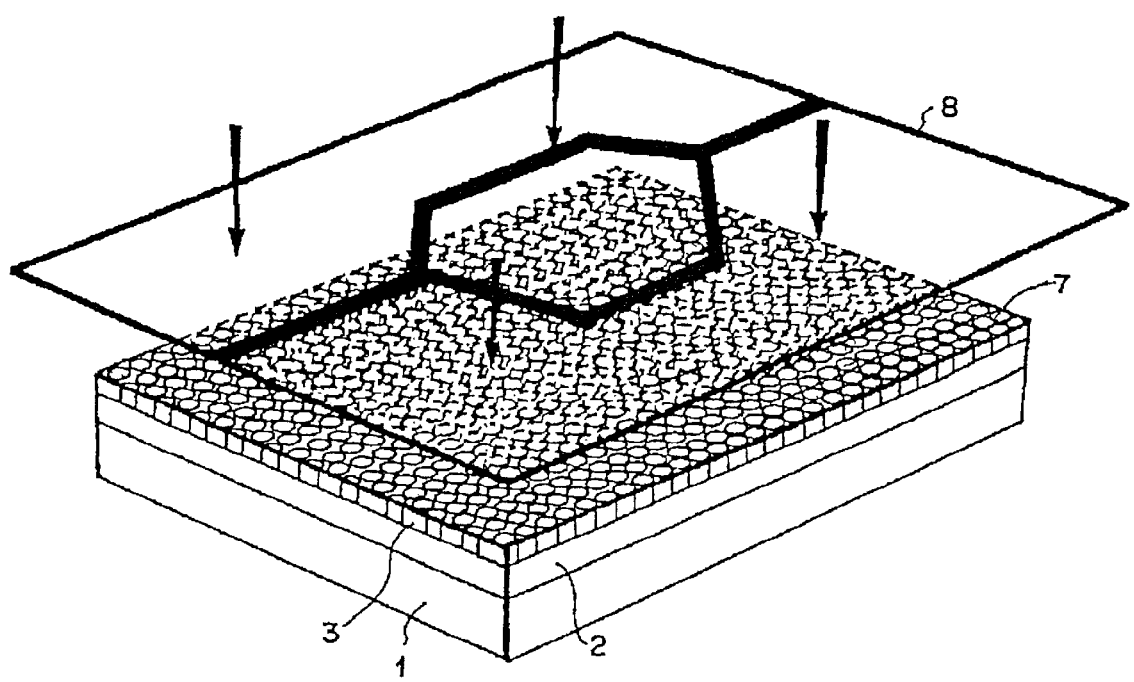
FIGS. 12A and 12B are fragmentary perspective views illustrative of a novel method of forming the photonic crystal waveguide in this sixth embodiment in accordance with the present invention.
Figure 12B:
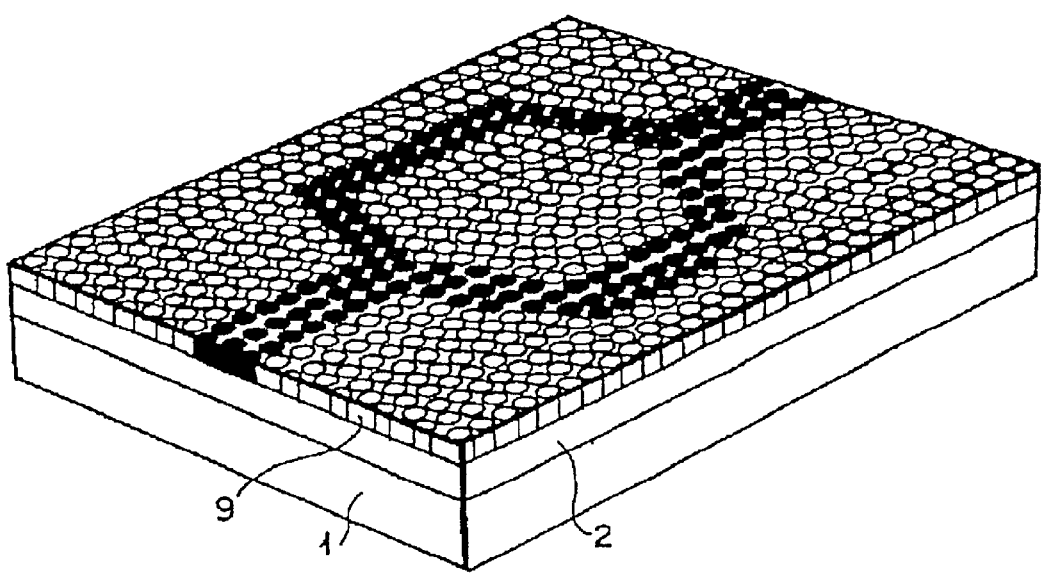
Figure 13:
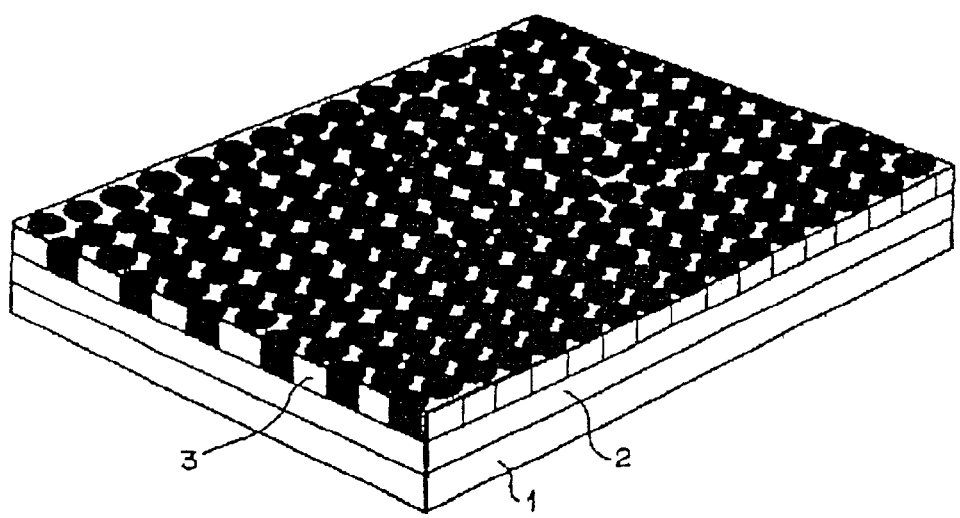
FIG. 13 is a fragmentary perspective view illustrative of an eighth novel photonic crystal waveguide in this sixth embodiment in accordance with the present invention.

A sixth embodiment according to the present invention will be described in detail with reference to the drawings. FIG. 10 is a fragmentary perspective view illustrative of a sixth novel photonic crystal waveguide in a sixth embodiment in accordance with the present invention. FIG. 11 is a fragmentary perspective view illustrative of a seventh novel photonic crystal waveguide in this sixth embodiment in accordance with the present invention. FIGS. 12A and 12B are fragmentary perspective views illustrative of a novel method of forming the photonic crystal waveguide in this sixth embodiment in accordance with the present invention. FIG. 13 is a fragmentary perspective view illustrative of an eighth novel photonic crystal waveguide in this sixth embodiment in accordance with the present invention.

The sixth novel photonic crystal waveguide has a two-dimensional slab photonic crystal layered structure. This two-dimensional slab photonic crystal layered structure comprises a bottom cladding layer 2 having a thickness of 2 micrometers over a silicon substrate 1 and a photonic crystal core layer 3 having a thickness of 2 micrometers over the bottom cladding layer 2. The bottom cladding layer 2 is made of silicon dioxide having a refractive index of about 1.5. A top surface of the photonic crystal core layer 3 is exposed to an air. This air serves as a top cladding layer having a refractive index of 1. The photonic crystal core layer 3 may be made of silicon. The photonic crystal core layer 3 has arrays of through holes 30 which completely penetrate the photonic crystal core layer 3 and reach the top surface of the bottom cladding layer 2, wherein the through holes 30 are distributed entirely throughout the photonic crystal core layer 3 at a center pitch in the range of 0.6–0.8 micrometers. The diameter of the through holes 30 may be about the wavelength of the propagating light. The center pitch is defined to be a distance between centers of adjacent two of the distributed through holes 30. The through holes 30 have a diameter of about 0.5 micrometers. The distribution of the through holes 30 may comprise a two-dimensional periodical array, for example, in the form of square-lattice, triangle-lattice or hexagonal-lattice. The sixth novel photonic crystal waveguide has an I-shaped waveguide 5, whilst the seventh photonic crystal waveguide has an Y-shaped waveguide 5. The through holes 30 except on the waveguide region 5 are filled with the air having the reflective index of 1. The through holes 30 on the waveguide region 5 are filled with a material having a refractive index of higher than 1. The reflective index of the waveguide region 5 is higher than the remaining part of the photonic crystal core layer 3, so that the light is confined in the waveguide region 5. The available materials having the higher refractive indexes than 1 are, for example, dielectric materials such as silicon dioxide and a resist material. If the resist material is used as a filler into the through holes on the waveguide region, then the following method may be available.

With reference to FIG. 12A, a resist 7 is applied on an entire top surface of the photonic crystal core layer 3. A photo-mask 8 is used which has a waveguide pattern for carrying out an exposure process.

With reference to FIG. 12B, a development is carried out to dissolve the exposed resist, wherein the unexposed resist remains on the waveguide region, whereby the waveguide is formed in the photonic crystal core layer 3.

The preferable resist materials are preferably small in absorption loss in the long wavelength band. One of the preferable resist materials is, for example, poly-methyl-methacrylate (PMMA). Polyimide and BCB are also available as the filler materials in the through holes in place of the resist material because polyimide and BCB are low in absorption loss in the long wavelength band.

The eighth novel photonic crystal waveguide uses those materials other than the resist as shown in FIG. 13. The filler material has a temperature coefficient having an inverse sign to the temperature coefficient of the photonic crystal of the core layer 3 for canceling the temperature variation and realizing athermalization or the temperature-independency.

In this embodiment, the novel photonic crystal waveguide is made of the $Si/SiO_2$ based materials over the silicon substrate. It is, of course, possible that the novel photonic crystal waveguide is made of other materials, for example, AlGaAs based materials over a GaAs substrate, and InGaAsP based materials over an InP substrate.

In this embodiment, the top cladding layer comprises an air having a reflective index of 1. It is, of course, possible to further provide a top cladding layer of the same material as the bottom cladding layer to provide a three-dimensional photonic crystal layered structure.

As further modifications to the foregoing embodiments, it is possible to optically combine two or three of the first or second embodiment, the third or fourth embodiment, and the sixth embodiment. It is also possible to apply the above waveguide structure to various optical devices such as directional copular.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A photonic crystal waveguide comprising:
   a substrate;
   a bottom cladding layer over said substrate; and
   a core layer over said bottom cladding layer, said core layer having a uniform distribution of holes;
   wherein said core layer has at least a waveguide region which is thicker than a remaining region of said core layer to cause a refractive index guide effect.

2. The photonic crystal waveguide as claimed in claim 1, wherein said waveguide region has a ridged shape.

3. The photonic crystal waveguide as claimed in claim 1, wherein a plurality of said waveguide region extends in parallel to each other and distanced from each other to form a directional copular.

4. The photonic crystal waveguide as claimed in claim 1, wherein said core layer is made of such a photonic crystal material that a wavelength of a light to be propagated through said waveguide region is in the vicinity of a photonic band gap edge of said photonic crystal material in order to utilize an intense dispersion phenomenon.

5. The photonic crystal waveguide as claimed in claim 1, wherein said uniform distribution of said holes comprises a two-dimensional periodical array of through holes at a constant pitch between centers of adjacent two of said through holes.

6. The photonic crystal waveguide as claimed in claim 1, wherein said uniform distribution of said holes comprises a three-dimensional periodical array of holes at a constant pitch between centers of adjacent two of said through holes.

7. The photonic crystal waveguide as claimed in claim 1, wherein said holes are filled with an air.

8. The photonic crystal waveguide as claimed in claim 1, further comprising a top cladding layer over said core layer.

9. The photonic crystal waveguide as claimed in claim 1, wherein a dielectric pattern is provided on said waveguide region, and said dielectric pattern has a refractive index higher than a substance in contact with a top surface of said core layer.

10. The photonic crystal waveguide as claimed in claim 1, wherein said holes except on said waveguide region are filled with an air, whilst said holes on said waveguide regions are filled with a filler material having a refractive index higher than 1.

11. The photonic crystal waveguide as claimed in claim 10, wherein a dielectric pattern is provided on said waveguide region, and said dielectric pattern has a refractive index higher than a substance in contact with a top surface of said core layer.

12. A photonic crystal waveguide comprising:
    a substrate;
    a bottom cladding layer over said substrate; and
    a core layer with a uniform thickness over said bottom cladding layer, said core layer having a uniform distribution of holes;
    wherein said core layer has at least a waveguide region, on which a dielectric pattern is provided which has a refractive index higher than a substance in contact with a top surface of said core layer.

13. The photonic crystal waveguide as claimed in claim 12, wherein said substance in contact with said top surface of said core layer is an air, and said refractive index of said dielectric pattern is higher than 1.

14. The photonic crystal waveguide as claimed in claim 12, further comprising a top cladding layer over said core layer, and said top cladding layer is made of the same material as said bottom cladding layer, and said substance in contact with said top surface of said core layer is the same material as said bottom cladding layer, and said refractive index of said dielectric pattern is higher than said top cladding layer.

15. The photonic crystal waveguide as claimed in claim 12, wherein a plurality of said waveguide region extends in parallel to each other and distanced from each other to form a directional copular.

16. The photonic crystal waveguide as claimed in claim 12, wherein said core layer is made of such a photonic crystal material that a wavelength of a light to be propagated through said waveguide region is in the vicinity of a photonic band gap edge of said photonic crystal material in order to utilize an intense dispersion phenomenon.

17. The photonic crystal waveguide as claimed in claim 12, wherein said uniform distribution of said holes comprises a two-dimensional periodical array of through holes at a constant pitch between centers of adjacent two of said through holes.

18. The photonic crystal waveguide as claimed in claim 12, wherein said uniform distribution of said holes comprises a three-dimensional periodical array of holes at a constant pitch between centers of adjacent two of said through holes.

19. The photonic crystal waveguide as claimed in claim 12, wherein said holes are filled with an air.

20. The photonic crystal waveguide as claimed in claim 12, wherein said waveguide region is thicker than a remaining region of said core layer to cause a refractive index guide effect.

21. The photonic crystal waveguide as claimed in claim 12, wherein said holes except on said waveguide region are filled with an air, whilst said holes on said waveguide regions are filled with a filler material having a refractive index higher than 1.

22. The photonic crystal waveguide as claimed in claim 21, wherein said waveguide region is thicker than a remaining region of said core layer to cause a refractive index guide effect.

23. A photonic crystal waveguide comprising:
a substrate;
a bottom cladding layer over said substrate; and
a core layer with a uniform thickness over said bottom cladding layer, said core layer having a uniform distribution of holes;
wherein said core layer has at least a waveguide region, and said holes except on said waveguide region are filled with an air, whilst said holes on said waveguide regions are filled with a filler material having a refractive index higher than 1.

24. The photonic crystal waveguide as claimed in claim 23, wherein a plurality of said waveguide region extends in parallel to each other and distanced from each other to form a directional copular.

25. The photonic crystal waveguide as claimed in claim 23, wherein said core layer is made of such a photonic crystal material that a wavelength of a light to be propagated through said waveguide region is in the vicinity of a photonic band gap edge of said photonic crystal material in order to utilize an intense dispersion phenomenon.

26. The photonic crystal waveguide as claimed in claim 23, wherein said uniform distribution of said holes comprises a two-dimensional periodical array of through holes at a constant pitch between centers of adjacent two of said through holes.

27. The photonic crystal waveguide as claimed in claim 23, wherein said uniform distribution of said holes comprises a three-dimensional periodical array of holes at a constant pitch between centers of adjacent two of said through holes.

28. The photonic crystal waveguide as claimed in claim 23, further comprising a top cladding layer over said core layer.

29. The photonic crystal waveguide as claimed in claim 23, wherein said filler material has a temperature coefficient which is inverse in sign to a temperature coefficient of a base material of said core layer.

30. The photonic crystal waveguide as claimed in claim 23, wherein said waveguide region is thicker than a remaining region of said core layer to cause a refractive index guide effect.

31. The photonic crystal waveguide as claimed in claim 23, wherein a dielectric pattern is provided on said waveguide region, and said dielectric pattern has a refractive index higher than a substance in contact with a top surface of said core layer.

32. The photonic crystal waveguide as claimed in claim 31, wherein said waveguide region is thicker than a remaining region of said core layer to cause a refractive index guide effect.

33. A directional coupler comprising:
a substrate;
a bottom cladding layer over said substrate; and
a photonic crystal core layer over said bottom cladding layer, said core layer having a uniform distribution of holes, and said core layer being made of such a photonic crystal material that a wavelength of a light to be propagated through said waveguide region is in the vicinity of a photonic band gap edge of said photonic crystal material in order to utilize an intense dispersion phenomenon; and said core layer having a pair of stripe-shaped waveguide regions which extends in parallel to each other,
wherein said stripe-shaped waveguide regions are thicker than a remaining region of said core layer to cause a refractive index guide effect.

34. The directional coupler as claimed in claim 33, wherein said uniform distribution of said holes comprises a two-dimensional periodical array of through holes at a constant pitch between centers of adjacent two of said through holes.

35. The directional coupler as claimed in claim 33, wherein said uniform distribution of said holes comprises a three-dimensional periodical array of holes at a constant pitch between centers of adjacent two of said through holes.

36. The directional coupler as claimed in claim 33, further comprising a top cladding layer over said core layer.

37. The directional coupler as claimed in claim 33, wherein said waveguide region has a ridged shape.

38. The directional coupler as claimed in claim 1, wherein said holes are filled with an air.

39. A directional coupler comprising:
a substrate;
a bottom cladding layer over said substrate; and
a photonic crystal core layer over said bottom cladding layer, said core layer having a uniform distribution of holes, and said core layer being made of such a photonic crystal material that a wavelength of a light to be propagated through said waveguide region is in the vicinity of a photonic band gap edge of said photonic crystal material in order to utilize an intense dispersion phenomenon; and said core layer having a pair of stripe-shaped waveguide regions which extends in parallel to each other,
wherein dielectric patterns is provided on said waveguide regions, and said dielectric patterns have a refractive index higher than a substance in contact with a top surface of said core layer.

40. The directional coupler as claimed in claim 39, wherein said substance in contact with said top surface of said core layer is an air, and said refractive index of said dielectric pattern is higher than 1.

41. The directional coupler as claimed in claim 39, further comprising a top cladding layer over said core layer, and said top cladding layer is made of the same material as said bottom cladding layer, and said substance in contact with said top surface of said core layer is the same material as said bottom cladding layer, and said refractive index of said dielectric pattern is higher than said top cladding layer.

42. The directional coupler as claimed in claim 39, wherein said uniform distribution of said holes comprises a two-dimensional periodical array of through holes at a constant pitch between centers of adjacent two of said through holes.

43. The directional coupler as claimed in claim 39, wherein said uniform distribution of said holes comprises a three-dimensional periodical array of holes at a constant pitch between centers of adjacent two of said through holes.

44. The directional coupler as claimed in claim 12, wherein said holes are filled with an air.

45. A directional coupler comprising:

a substrate;

a bottom cladding layer over said substrate; and a photonic crystal core layer over said bottom cladding layer, said core layer having a uniform distribution of holes, and said core layer being made of such a photonic crystal material that a wavelength of a light to be propagated through said waveguide region is in the vicinity of a photonic band gap edge of said photonic crystal material in order to utilize an intense dispersion phenomenon; and said core layer having a pair of stripe-shaped waveguide regions which extends in parallel to each other, wherein said core layer has at least a waveguide region, and said holes except on said waveguide region are filled with an air, whilst said holes on said waveguide regions are filled with a filler material having a refractive index higher than 1.

46. The directional coupler as claimed in claim 45, wherein said uniform distribution of said holes comprises a two-dimensional periodical array of through holes at a constant pitch between centers of adjacent two of said through holes.

47. The directional coupler as claimed in claim 45, wherein said uniform distribution of said holes comprises a three-dimensional periodical array of holes at a constant pitch between centers of adjacent two of said through holes.

48. The directional coupler as claimed in claim 45, further comprising a top cladding layer over said core layer.

49. The directional coupler as claimed in claim 45, wherein said filler material has a temperature coefficient which is inverse in sign to a temperature coefficient of a base material of said core layer.

* * * * *